(12) United States Patent
Civitani et al.

(10) Patent No.: US 11,945,017 B2
(45) Date of Patent: Apr. 2, 2024

(54) PROCESS FOR MANUFACTURING OPTICAL ELEMENTS FOR TELESCOPE OPTICS USABLE IN SPACE MISSIONS

(71) Applicant: ISTITUTO NAZIONALE DI ASTROFISICA, Rome (IT)

(72) Inventors: Marta Maria Civitani, Rome (IT); Luigi Lessio, Rome (IT); Giovanni Pareschi, Rome (IT); Giorgio Toso, Rome (IT); Salvatore Incorvaia, Rome (IT)

(73) Assignee: ISTITUTO NAZIONALE DI ASTROFISICA (IT)

( * ) Notice: Subject to any disclaimer, the term of this patent is extended or adjusted under 35 U.S.C. 154(b) by 0 days.

(21) Appl. No.: 18/005,093

(22) PCT Filed: Jul. 14, 2021

(86) PCT No.: PCT/IB2021/056335
§ 371 (c)(1),
(2) Date: Jan. 11, 2023

(87) PCT Pub. No.: WO2022/013768
PCT Pub. Date: Jan. 20, 2022

(65) Prior Publication Data
US 2023/0256494 A1    Aug. 17, 2023

(30) Foreign Application Priority Data
Jul. 14, 2020    (IT) .................. 102020000017086

(51) Int. Cl.
*B21D 22/14*    (2006.01)
*B23K 31/02*    (2006.01)
*C23C 18/16*    (2006.01)
*C23C 18/32*    (2006.01)

(52) U.S. Cl.
CPC .............. *B21D 22/14* (2013.01); *B23K 31/02* (2013.01); *C23C 18/1689* (2013.01); *C23C 18/32* (2013.01)

(58) Field of Classification Search
CPC ............. G21K 1/067; G21K 2201/064; G21K 2201/067; B21D 22/16; B21D 53/16; B21D 22/14; B24B 13/015; B23P 13/00; B23P 15/22; G02B 23/00; G02B 23/02; G02B 7/183; G02B 5/10; C23C 18/32; C23C 18/1689; B23K 31/02
See application file for complete search history.

(56) References Cited

U.S. PATENT DOCUMENTS

2006/0197423 A1    9/2006    Mutsuki et al.

FOREIGN PATENT DOCUMENTS

EP    2083328 A1    7/2009
EP    2746850 A1    6/2014

OTHER PUBLICATIONS

T.P., O'Brien et al. Multi-Slit Mask Fabrication on Spherical Electroformed Shell Substrates, SPIE, PO Box 10 Bellingham WA 98227-0010 USA; vol. SPIE, No. 6273, Jul. 6, 2006, pp. 62732V-1 to 62732V-4, XP040227283.

*Primary Examiner* — Moshe Wilensky
(74) *Attorney, Agent, or Firm* — The Belles Group, P.C.

(57) ABSTRACT

A process for manufacturing an optical element comprising a first step of spinning a circular sheet of a first metallic material for it to adhere to a rotating matrix and form a shell; a second step of assembling the shell on a temporary support; and at least a third step of diamond turning the shell by means of a diamond tool to obtain an optical surface.

16 Claims, 3 Drawing Sheets

PROCESS FOR MANUFACTURING OPTICAL ELEMENTS FOR TELESCOPE OPTICS USABLE IN SPACE MISSIONS

CROSS-REFERENCE TO RELATED APPLICATIONS

This patent application is a U.S. national stage application under 35 U.S.C. § 371 of PCT application no. PCT/IB2021/056335, filed on Jul. 14, 2021, which claims priority from Italian patent application no. 102020000017086 filed on Jul. 14, 2020, The entire disclosure of the aforementioned priority applications are incorporated herein by reference in their entireties.

TECHNICAL FIELD

The present invention concerns a process for manufacturing optical elements, particularly for telescope optics usable in space missions.

The invention is preferably, although not exclusively, applied in the manufacturing of grazing incidence optics for telescopes for X rays, which will be referred to in particular, albeit without loss of generality.

BACKGROUND ART

Grazing incidence optics comprise a plurality of aspherical annular optical elements concentric to one another; for example, in the Wolter-I configuration, each element has a portion with parabolic section and a portion with hyperbolic section.

These optics, especially in the case of large mirrors (for example in the order of 3 m in diameter), can be manufactured by means of a modular process, namely producing a series of modules each consisting of a plurality of segments "stacked" on and spaced from one another. The segments consist typically of a sheet of glass (fused silica or borofloat glass or other types of glass) or silicon wafers having dimensions in the order of 100 mm×100 mm and thickness typically less than 1 mm. Complete optics can comprise up to tens of thousands of segments.

A problem connected with this construction technique is the fact that the creation of each module and the integration of the modules to form the complete mirror are long and costly operations; the process also has limits in terms of accuracy connected with the difficulty of integrating a large number of modules while maintaining a high precision.

An alternative technique consists in producing the mirror from a limited number of monolithic annular glass shells (for example less than two hundred for optics with external diameter of 3 m).

This avoids the operations of assembly and integration of the modules and results in improved performance thanks to the azimuthal symmetry of the shells.

However, glass shells are costly and fragile, and entail long procurement times. The minimum thickness of these shells is limited by the safety factors necessary for fragile materials in the work processes and not by the mechanical strength of the material. In particular, surface treatments on the outer surface are necessary to increase mechanical strength.

Although preferable in terms of quality, the technique using monolithic glass shells therefore has significant limits of use.

Optical elements are also produced from a single metallic piece obtained by means of casting and machining to remove material until obtaining a thin shaped substrate. Also this technique has significant drawbacks: production difficulties with thin substrates, high cost of the initial single piece obtained by casting, long working times, very limited possibility of checking uniformity of the material until the end of the work process, non-uniform residual stress in the material, and risks of breakage during work. Alternatively, a very widespread technique for producing mirrors in one piece is replication by means of nickel electroforming starting from a metallic mandrel having negative profile of the mirror to be produced. However, also this approach has some contra-indications such as: i) difficulty of producing mirrors with large diameter, limited above all by the difficulty of producing large-size mandrels with optical grade lapped surface (the largest diameter mirror produced so far with this method is 70 cm diameter); ii) the high density of the nickel, which is a drawback for producing instruments for flying in space; iii) the difficulty of obtaining very high angular resolutions with the replication technique.

DISCLOSURE OF INVENTION

The object of the present invention is to make available an alternative process for the manufacture of optical elements, which solves the problems connected with the known methods described above.

The above-mentioned object is achieved by a process according to claim 1.

BRIEF DESCRIPTION OF THE DRAWINGS

For a better understanding of the present invention, a preferred embodiment is described below, by way of non-limiting example and with reference to the attached drawings, in which.

BEST MODE FOR CARRYING OUT THE INVENTION

Figure 1:
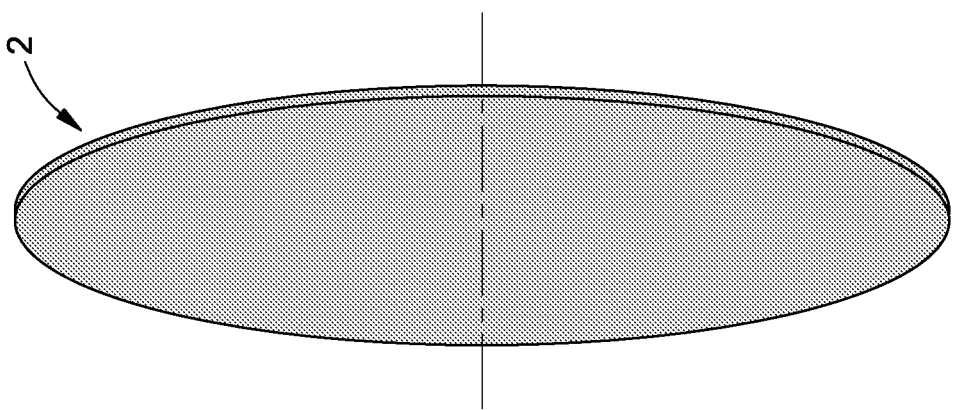
FIG. 1 is a perspective schematic view of a semi-finished product for the production of a shell.

According to the present invention, an optical element 1 (FIG. 9) is produced starting from a circular metal sheet 2 (FIG. 1). The material is preferably an aluminium alloy, for example aluminium alloys with magnesium (0.4-1.7%), manganese (0.5-1%) and silicon (1-5%) like Anticorodal. The thickness of the sheet ranges from 0.5 to 15 mm and is preferably approximately 2 mm.

According to the present invention, the sheet 2 initially undergoes a step known as metal spinning, in which the sheet 2 is axially blocked between a shaped matrix 3, defining the shape to be obtained, mounted on the mandrel of a lathe (not illustrated), and a counter-head 4.

The matrix 3, the counter-head 4 and the sheet 2 are coaxial to one another.

The mandrel is made to rotate and consequently rotates the matrix 3/sheet 2/counter-head 4 assembly.

During the rotation, the sheet 2 is deformed by means of a tool 5 which acts on the face of the sheet opposite the matrix 3 and is moved parallel to a generatrix of said matrix, so as to deform the sheet 2 and cause it to adhere progressively to an outer surface 6 of the matrix 3, reproducing the shape thereof.

Figure 3:
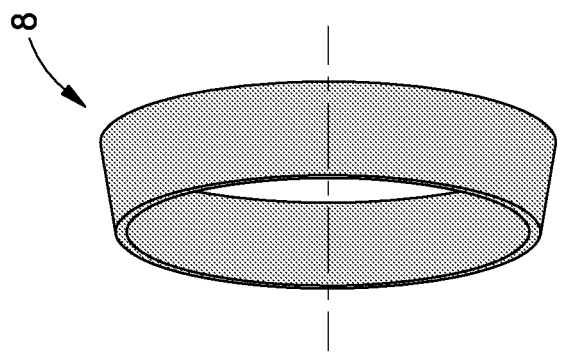
FIG. 3 is a perspective schematic view of a semi-finished product at the end of the phase of FIG. 2.
Figure 2:
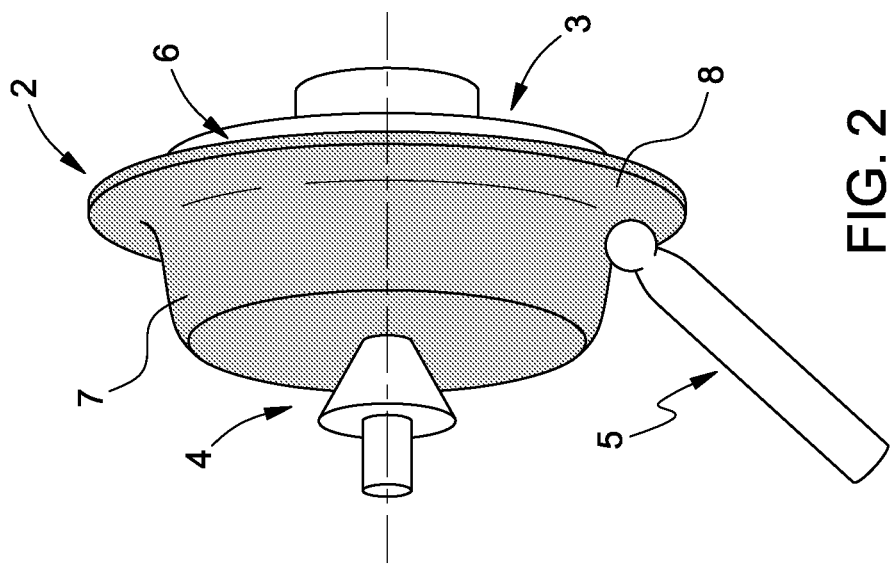
FIG. 2 is a schematic representation of a first work phase according to the process of the invention.

At the end of this phase of the process, a central portion 7 of the sheet 2, and if necessary an outer edge 8 opposite thereto, are removed by means of any known cutting process, thus obtaining a semi-finished product 8 in the form of an axialsymmetric shell (below, for the sake of brevity, "shell 8"), similar to that of the optical element to be obtained (FIG. 3).

Figure 4:
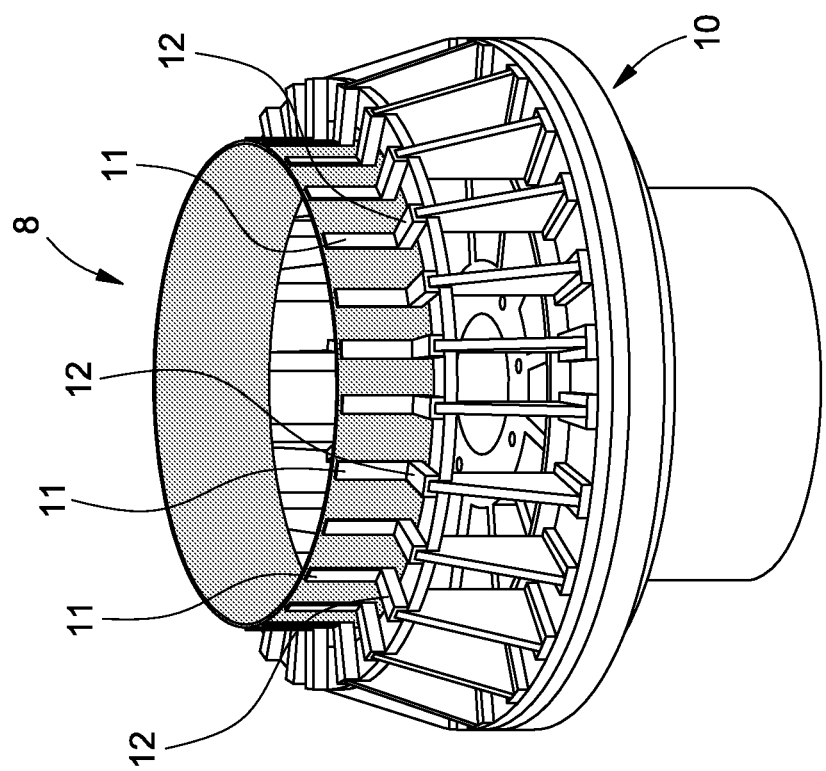
FIG. 4 illustrates the semi-finished product of FIG. 3 in a support structure for the subsequent work phases.

The shell 8 is then mounted inside a support 10 (FIG. 4), preferably with vertical axis, which blocks it axially and radially so as to induce the minimum possible level of stress and, therefore, internal tensions in the material. For this purpose, the support can be provided with a plurality of support ribs 11 extending along equally spaced external generatrices of the shell 8.

Alternatively, the ribs 11 can be fixed to the shell, for example by means of gluing or welding, prior to removing the shell 8 from the matrix 3; the ribs 11 can therefore constitute positioning and fixing elements in the support 10, provided with fixing elements 12 cooperating with the ribs 11.

Figure 9:
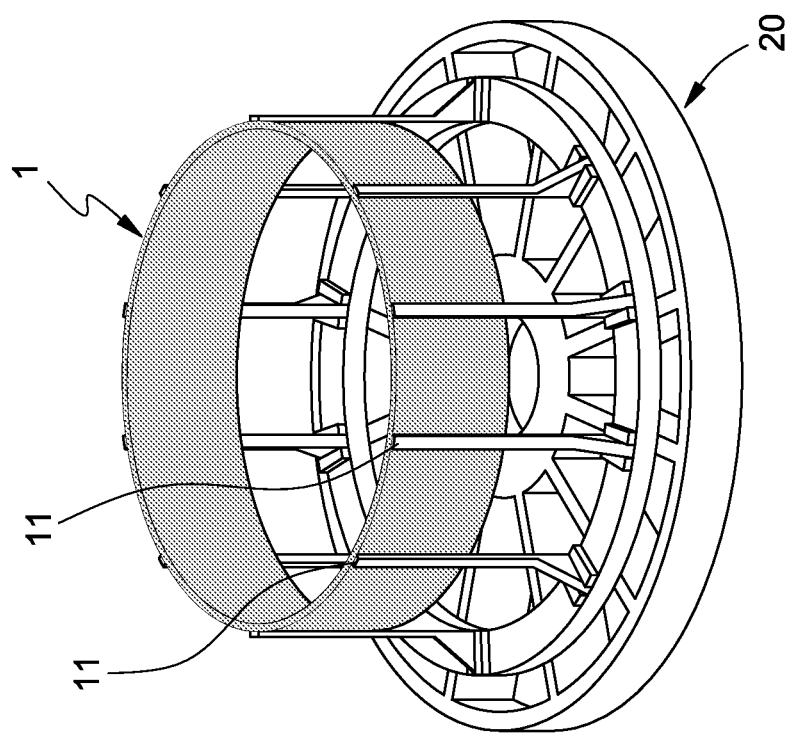
FIG. 9 illustrates the finished optical element in a support structure for integration with other optical elements.

Once positioned in the support 10, the shell 8 undergoes a series of successive steps of the process (FIGS. 5-8) until the finished optical element 1 is produced (FIG. 9).

Figure 5:
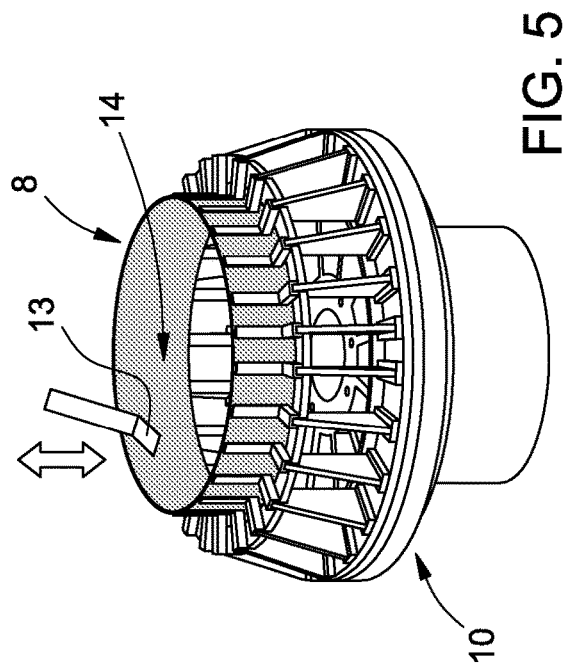
FIGS. 5, 6, 7 and 8 are schematic representations of subsequent work phases of the process of the invention.
Figure 6:
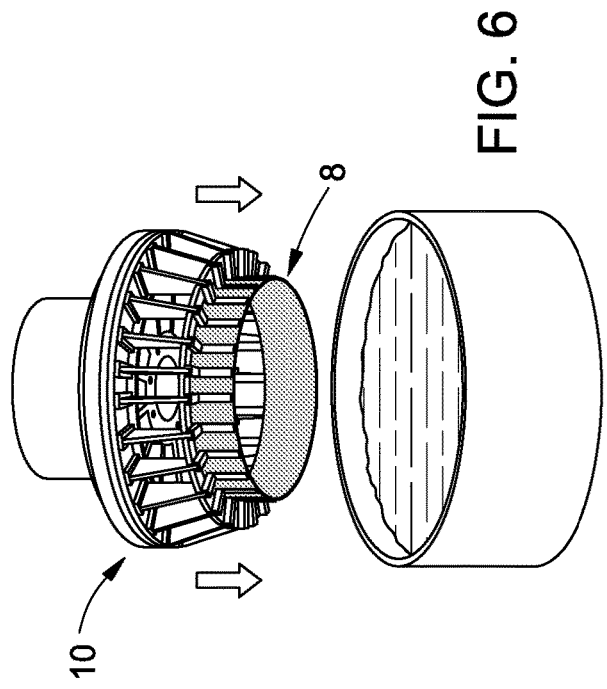

With reference to FIG. 5, the shell 8 undergoes a diamond spinning step (precision turning by means of a diamond tool 13). The support 10 is mounted on a mandrel with vertical axis, not illustrated, and rotated. The diamond tool 13 is brought into contact with an optical surface 14 (in the example illustrated the internal surface) of the shell 8, which is machined at very high precision.

Subsequently (FIG. 6), the optical surface 14 of the shell is coated with electroless nickel (nickel phosphorous alloy, for example Kanigen®) by means of a deposition process by immersion in an autocatalytic chemical bath in aqueous solution. In this way a coating layer is obtained ranging from 10 to 100 μm, and preferably equal to approximately 20 μm. The immersion in the bath is preferably carried out without removing the shell 8 from the support 10, which can be overturned prior to immersion. In this way the shell is not subject to undesired tension. Alternatively, the shell 8 can be removed from the support 10 and mounted on another dedicated support for immersion in the bath.

Figure 7:
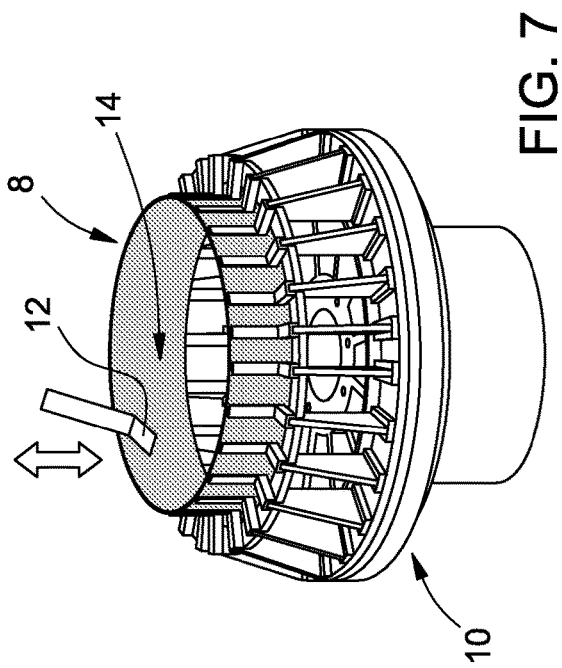
Figure 8:
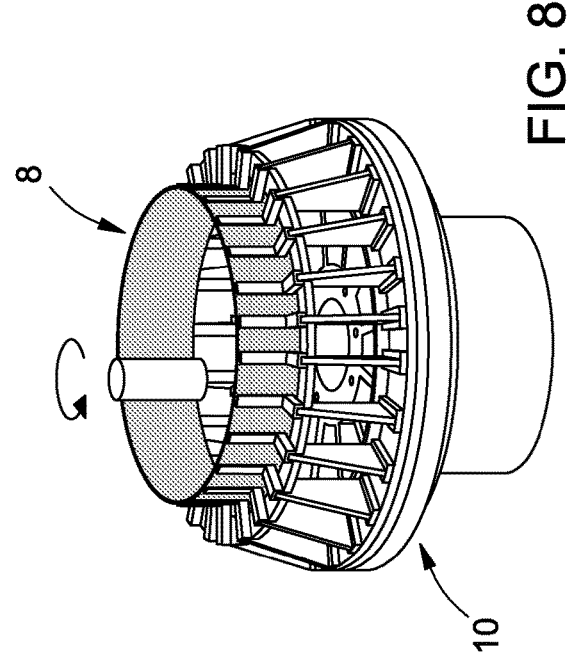

Subsequently, the shell 8 can undergo a second diamond spinning step (optional)—FIG. 7—in which any deformations induced by the nickel plating can be corrected and the design geometry is restored to the optical surface 14.

Lastly, (FIG. 8) the optical surface 14 can undergo a final step (optional) of grinding the azimuthal surfaces with precision milling, moderation of the profile by means of bonnet polishing and superpolishing with pitch pads or other abrasive materials to obtain a finished optical element 1 with a micro-roughness of the optical surface 14 less than fractions of a nanometre.

Once finished, the optical element 1 is assembled on an integration support 20 (FIG. 9), expediently composed of a circular structure on which the different shells forming the optics are coaxially fixed by means of fixing equipment 21 which can cooperate with the ribs 11 of the shell 8, if present.

The integration support 20 is expediently made of the same material as the shells 8, for example aluminium, so as to produce optics which are free from thermally induced tensions, mechanically stable and lightweight.

The process is then repeated to produce other optical elements 1 which are assembled coaxially on the integration support 20, thus forming the complete optics.

From an examination of the process described, the advantages offered by the present invention are evident.

Use of the spinning technique allows elimination of the drawbacks connected with the known techniques for the production of glass shells, and with the known techniques of casting and machining of metallic shells. It is therefore possible to produce optics at lower costs and without the risk of breakage of the shells during the process phases. The prototyping and production times of the optics are greatly reduced. Since it is a replication process, different prototypes or back-up optics can be produced at low cost.

Lastly it is clear that modifications and variations can be made to the process described that do not depart from the protective scope of the present invention.

In particular, according to requirements in terms of precision of form and surface roughness, the nickel-plating and diamond spinning operations can be avoided.

On the opposite face of the optical surface, electrochemical treatments can be carried out to prevent oxidisation and/or machining, or electrical discharge machining, to lighten the material.

Support elements or patterns can also be provided or applied (for example by means of gluing, welding or 3D printing) on the above face while the shell is still supported on the matrix. The total thickness of the optics necessary to meet the structural requirements can be achieved by inserting lightened materials like honeycomb structures and composing the overall structure with two metallic shells.

The aluminium alloy for production of the shell can be chosen so as to harmonize the thermal expansion coefficient with respect to the support, mitigate the bimetal effect with the nickel and optimize the structural resistance.

Although described by way of example with reference to grazing incidence optics, the process subject of the invention can be used also for the production of normal incidence optics; in this case, the shell can be made like a cup-shaped body integrally defining the primary mirror and a tubular lateral wall of the telescope.

The process can be used also for the production of non axialsymmetric optics, provided that deviation of the profile of the matrix parallels from a circumference is sufficiently small to allow the diamond tool to follow said profile during rotation of the latter.

According to an optional variation of the process, the matrix can be treated with a silicone oil, for example Rhodorsil® 47 V 50 oil by Bluestar Silicones, designed to "fill" the microgrooves inevitably present on the matrix due to the machining it undergoes in the production phase. This prevents said microgrooves being reproduced on the sheet during the metal spinning phase, thus compromising the accuracy of the mirror.

According to a further optional variation of the process, the shell can undergo a stress-relieving anneal heat treatment between the machining operations and/or prior to deposition of the coating layer on the optical surface, so as to eliminate or at least reduce the internal tensions resulting from the machining.

The invention claimed is:
1. A process for manufacturing an optical element comprising:

a first step of spinning a circular sheet of a first metallic material for it to adhere to a rotating matrix and form a shell;

a second step of assembling the shell on a temporary support; and at least a third step of diamond turning the shell by means of a diamond tool to obtain an optical surface.

2. The process as claimed in claim 1, including a fourth step of deposition of a coating layer of a second metallic material on the optical surface.

3. The process as claimed in claim 1, wherein the first material is an aluminium alloy.

4. The process as claimed in claim 1, wherein the second material is a nickel alloy.

5. The process as claimed in claim 4, wherein the second material is electroless nickel.

6. The process as claimed in claim 2, including a fifth step of diamond turning the coating layer with a diamond tool.

7. The process as claimed in claim 6, including a sixth step of superpolishing the coating layer.

8. The process as claimed in claim 1, comprising at least one step of machining a surface of the shell opposite the optical surface while the semi-finished product is on said matrix.

9. The process as claimed in claim 8, wherein the processing step includes mechanical machining.

10. The process as claimed in claim 8, wherein the processing step includes an electrical discharge machining operation.

11. The process as claimed in claim 1, wherein a surface of the matrix on which the sheet is made to adhere is treated with silicone oil.

12. The process as claimed claim 1, comprising at least a step of fixing at least one support element on a surface of the semi-finished product opposite the optical surface while the shell is on said matrix.

13. The process as claimed in claim 12, wherein the fixing step includes a welding operation.

14. The process as claimed in claim 12, wherein the fixing step includes a gluing operation.

15. The process as claimed in claim 1, including the step of mounting the finished optical element on an integration support.

16. The process as claimed in claim 15, wherein the previous steps are repeated cyclically to make and mount a plurality of optical elements coaxial to one other on the integration support.

* * * * *